(12) United States Patent
Ramachandra et al.

(10) Patent No.: US 9,244,808 B2
(45) Date of Patent: Jan. 26, 2016

(54) PATTERN ORIENTED DATA COLLECTION AND ANALYSIS

(71) Applicant: International Business Machines Corporation, Armonk, NY (US)

(72) Inventors: Anoop G. M. Ramachandra, Mysore (IN); Murali K. Surampalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 14/038,968

(22) Filed: Sep. 27, 2013

(65) Prior Publication Data

US 2015/0095722 A1 Apr. 2, 2015

(51) Int. Cl.
*G06F 11/00* (2006.01)
*G06F 11/36* (2006.01)
*G06F 11/07* (2006.01)

(52) U.S. Cl.
CPC .......... *G06F 11/3604* (2013.01); *G06F 11/079* (2013.01); *G06F 11/0727* (2013.01); *G06F 11/0793* (2013.01)

(58) Field of Classification Search
CPC ............ G06F 11/3604; G06F 11/0727; G06F 11/0766; G06F 11/0769; G06F 11/079; G06F 11/0793; G06F 11/36; G06F 11/362
USPC ........... 714/37, 25, 26, 38.1, 45, 46, 47.1, 48, 714/57
See application file for complete search history.

(56) References Cited

U.S. PATENT DOCUMENTS

| | | | |
|---|---|---|---|
| 6,681,344 B1 | 1/2004 | Andrew | |
| 7,039,644 B2 | 5/2006 | Hind et al. | |
| 7,188,335 B1 | 3/2007 | Darr et al. | |
| 8,291,371 B2 | 10/2012 | Beaton et al. | |
| 8,332,765 B2 | 12/2012 | Ergan et al. | |
| 8,365,019 B2 | 1/2013 | Sailer et al. | |
| 2004/0054695 A1 | 3/2004 | Hind et al. | |
| 2006/0026466 A1 | 2/2006 | Pozarycki et al. | |
| 2008/0183704 A1* | 7/2008 | Miller et al. | 707/6 |
| 2011/0209010 A1* | 8/2011 | Morimura et al. | 714/57 |
| 2011/0302461 A1 | 12/2011 | Goertler et al. | |
| 2012/0066547 A1* | 3/2012 | Gilbert et al. | 714/26 |
| 2012/0102363 A1* | 4/2012 | Milojicic et al. | 714/37 |
| 2012/0278658 A1* | 11/2012 | Han et al. | 714/38.1 |
| 2015/0095709 A1 | 4/2015 | Ramachandra et al. | |

OTHER PUBLICATIONS

Depree, "Pattern Recognition in Software Engineering", May 1983 IEEE, pp. 48-53, <http://ieeexplore.ieee.org/xpl/articleDetails.jsp?reload=true&arnumber=1654379&contentType=Journals+%26+Magazines>.

(Continued)

*Primary Examiner* — Joseph D Manoskey
(74) *Attorney, Agent, or Firm* — Stephen R. Yoder (57) ABSTRACT

A process for determining a problematic condition while running software includes: loading a first pattern data set having a symptom code module, a problematic condition determination module, and a set of responsive action module (s), generating a runtime symptom code in response to a first problematic condition being caused by the running of the software on the computer, determining that the runtime symptom code matches a symptom code corresponding to the first pattern data set, determining that the first problematic condition caused the generation of the runtime symptom code, and taking a responsive action from a set of responsive action(s) that corresponds to the first problematic condition.

14 Claims, 5 Drawing Sheets

(56) References Cited

OTHER PUBLICATIONS

Ferenc et al., "Design Pattern Mining Enhanced by Machine Learning", Proceedings of the 21st IEEE International Conference on Software Maintenance (ICSM'05) 10636773/05 $20.00 © 2005 IEEE.

Justice et al., "Pattern Matching to Automate Solution Discovery Using Disparate Data Sources", ip.com, An IP.com Prior Art Database Technical Disclosure, Nov. 30, 2007, IPCOM000160821D, Copyright 2007 Microsoft, pp. 1-11.

* cited by examiner

PATTERN ORIENTED DATA COLLECTION AND ANALYSIS

FIELD OF THE INVENTION

The present invention relates generally to the field of computer software problem recognition and resolution.

BACKGROUND OF THE INVENTION

When an application software problem appears, the application server typically provides troubleshooting information to the users in the form of: (i) traces; (ii) JVM (Java virtual machine) logs; (iii) console messages; and/or (iv) FFDC (First Failure Data Capture). (Note: the term(s) "Java" and/or "Java virtual machine" may be subject to trademark rights in various jurisdictions throughout the world and are used here only in reference to the products or services properly denominated by the marks to the extent that such trademark rights may exist.)

Software support assistant tools perform tasks including: (i) searching the educational resources; (ii) searching support materials; and (iii) creating problem management records (PMRs) electronically. In operation, the software support tool provides a set of possible reasons and solutions, if available, for each of the possible problems.

SUMMARY

A method is presented for determining a problematic condition caused by running of software on a computer having a volatile memory that includes: loading a first pattern data set into volatile memory, with the first pattern data set including a symptom code module, problematic condition determination module and a set of responsive action module(s), with each responsive action module of the set of responsive action module(s) respectively corresponding to a different problematic condition, generating a runtime symptom code in response to a first problematic condition being caused by the running of the software on the computer, determining, by the symptom code module of the first pattern data set stored in the volatile memory, that the runtime symptom code matches a symptom code corresponding to the first pattern data set, determining, by the problematic condition determination module of the first pattern data set stored in the volatile memory, that the first problematic condition caused the generation of the runtime symptom code, and taking a responsive action, by the responsive action module, from the set of responsive action(s) stored in the volatile memory, that corresponds to the first problematic condition.

DETAILED DESCRIPTION

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
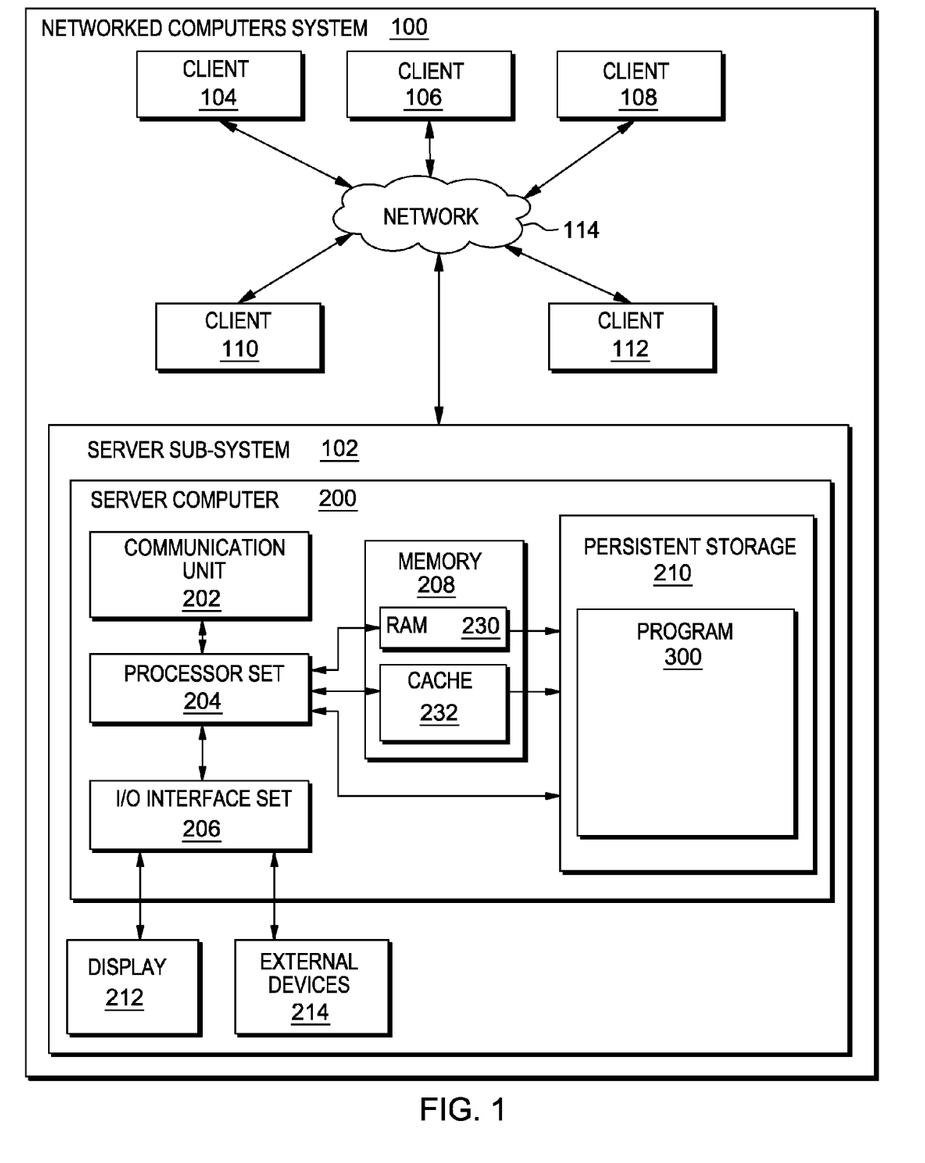
FIG. 1 is a schematic view of a first embodiment of a networked computers system according to the present invention.

An embodiment of a possible hardware and software environment for software and/or methods according to the present invention will now be described in detail with reference to FIG. 1. FIG. 1 is a functional block diagram illustrating various portions of networked computers system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 300.

Server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
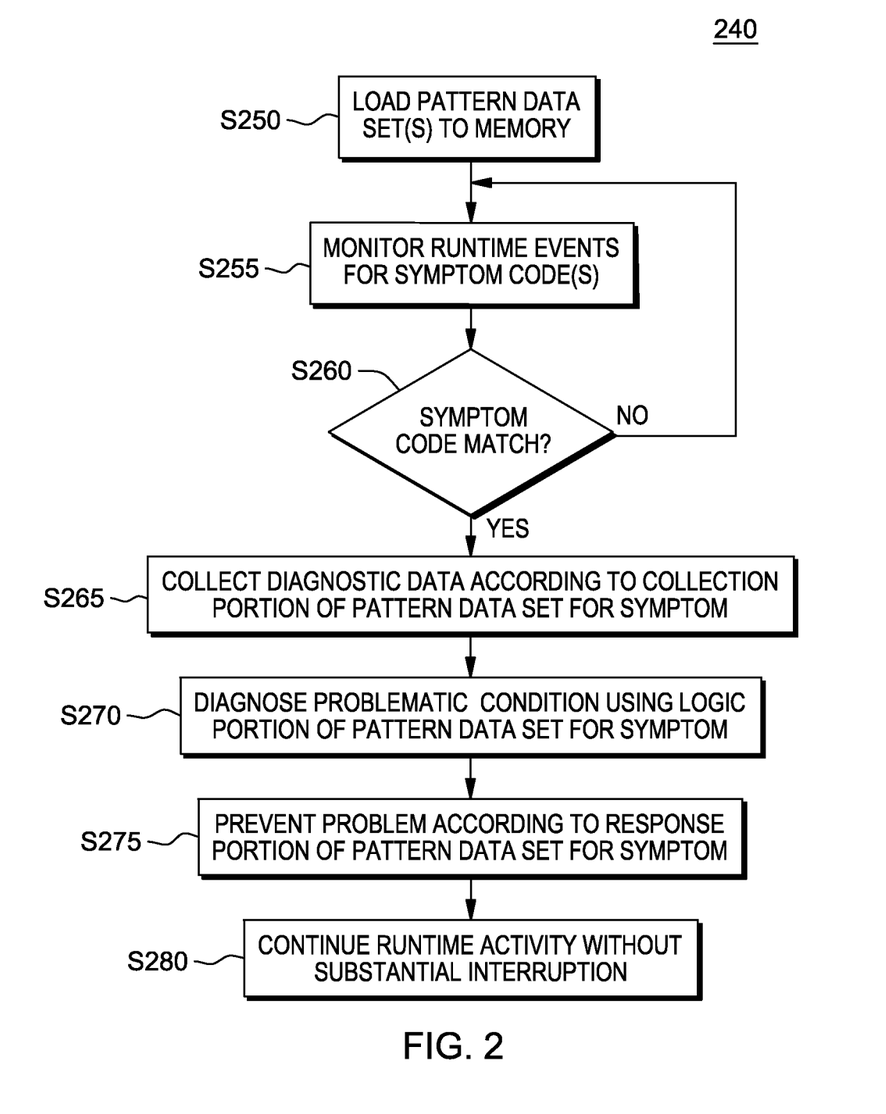
FIG. 2 is a flowchart showing a process performed, at least in part, by the first embodiment networked computers system.
Figure 3A:
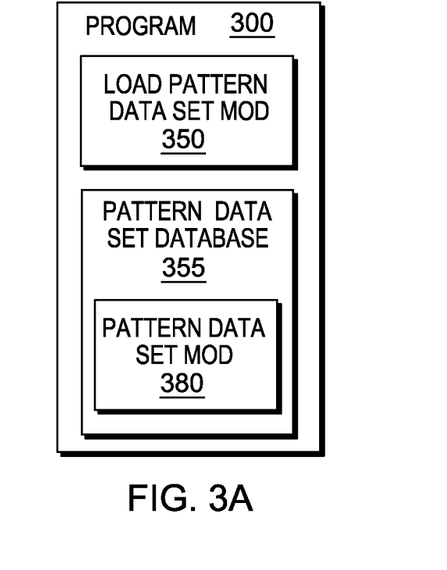
FIG. 3A is a schematic view of a first portion of the first embodiment networked computers system.
Figure 3B:
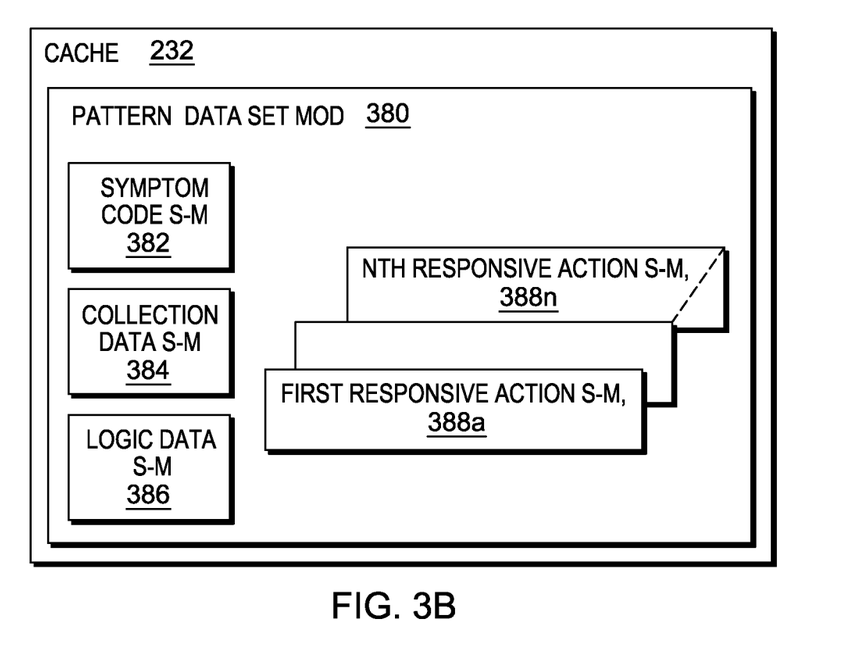
FIG. 3B is a schematic view of a second portion of the first embodiment networked computers system.

FIG. 2 shows flowchart 240 depicting a method according to the present invention. FIG. 3A shows program 300 for performing at least some of the method steps of flowchart 240. FIG. 3B shows cache 232 loaded with pattern data set module 380 according to an embodiment of the present invention. The methods and associated software will now be discussed, over the course of the following paragraphs, with extensive reference to FIG. 2 (for the method step blocks) and FIGS. 3A and 3B (for the software blocks).

Processing according to flowchart 240 begins at step S250, where load pattern data set module 350 of program 300 loads first dual purpose pattern data set module (also called, more simply, first pattern data set or first pattern) 380 from pattern data set database 355 of program 300 (see FIG. 3A) into cache 232 (see FIG. 3B). In this embodiment, pattern data set 380 is loaded into volatile, off-chip cache 232 (see FIG. 1) and remains there while the software is running. Alternatively, the pattern data set could be loaded into volatile RAM 230 (see FIG. 1) or a volatile on-chip cache (not shown). On the other hand, portions of program 300 (other than its pattern(s)) are loaded into volatile memory when its instructions are performed (for example, when the instructions of mod 350 are being actively performed, but instructions (other than the pattern) are usually held in non-volatile storage, such as device 210 (see FIG. 1).

Problems and/or potential problems will herein be collectively referred to as "problematic conditions." First pattern 380 contains information necessary to address several problematic conditions that are indicated by some given symptom (as will be discussed in more detail, below). The difference between a problem and a potential problem is that a problem will stop processing in a way likely to be noticed by a user, while a potential problem can be fixed so that processing does not really stop. This embodiment of FIGS. 2, 3A and 3B is a simple example where only one pattern data set module is used. In most cases, more than one pattern data set module is loaded into memory in step S250. Each pattern data set addresses a designated symptom code. For each symptom code of interest, a dedicated pattern is loaded into memory. Symptoms, symptom codes and their associated problematic conditions can be caused by causes such as the following: (i) configuration changes at the application server; (ii) application modifications; (iii) application server code defects; and/or (iv) product usage issues.

First pattern 380 is loaded into cache 232 at step S250 in order to reduce runtime delays associated with consulting a database, stored on non-volatile storage, the information included in the pattern (which information will be further discussed below). As shown in FIG. 3B, first pattern data set includes: symptom code sub-module 382; collection data sub-module 384; logic data sub-module 386; responsive action sub-modules 388a to n. As will be described in the following steps, pattern data set mod 380 and its corresponding sub-modules are accessed in cache 232 during runtime to quickly respond to a particular problematic condition as it arises.

Processing proceeds to step S255, where symptom code sub-module 382, as loaded into cache 232, monitors runtime events for symptom codes. Each pattern has a unique symptom code, corresponding respectively to a unique symptom or set of symptoms. The symptoms for a given symptom code are identified by personnel having experience with the particular problematic conditions addressed by the pattern. In many cases, the set of symptom codes are provided as part of the software being run.

It is noted that knowing a symptom code is not the same as knowing exactly what problematic condition has arisen. A single symptom code will usually correspond to multiple, possible problematic conditions. However, detecting the symptom code is a preliminary step to detecting the exact problematic condition because the symptom code quickly narrows down the set of possible problematic conditions.

Processing proceeds to step S260, where symptom code sub-module 382, stored in cache 232 (see FIG. 3B) attempts to match the symptom code generated by running software with the symptom code to which first pattern 380 corresponds. In this simplified embodiment, there is only a single pattern in the cache with a single symptom code sub-module. Alternatively, in embodiments where many patterns are loaded into the cache, the symptom code generated by running the software will be attempted to be matched against the respective symptom codes of all the patterns stored in cache 232.

On condition that there is a symptom code match at step S260, processing proceeds to step S265, where collection data module 384 executes collection instructions. The collection data sub-mod includes collection instructions for collecting data to diagnose the specific problematic condition which caused the matching symptom code for the first pattern (again, a single symptom code will generally be indicative of multiple, different, possible problematic conditions). The collection data sub-module collects data according to the stored instructions. The actual data collected depends on the detected problematic condition and may include, but is not limited to: (i) runtime tracing; (ii) PMI (Performance Monitoring Infrastructure) metrics; and/or (iii) FFDC.

Unlike the generation of the symptom code, the data collection of step S265 will generally require steps to be taken that go beyond merely running the software. However, these steps are preferably performable, and performed, quite quickly so that a potential problem does not become a problem that actually stops execution of the software in a crash. This is why collection data sub-module 384, directing and controlling this data collection, is stored, as part of first pattern 380, in volatile cache 232 for quick access and quick data collection.

When data collection is complete, processing proceeds to step S270, where logic data sub-mod 386 diagnoses the problematic condition based on the data collected previously at step S265. The logic data sub-mod includes the logic necessary for diagnosing the problematic condition using the collected diagnostic data as required by the collection sub-mod. To explain more specifically, the collected data will allow selection among and between various possible problematic conditions (which are associated with a common symptom code). In this example, first pattern 380 covers 14 possible problematic conditions a to n. At step S270, sub-mod 386 determines which problematic condition is the one that has actually been encountered: problem a, problem b, problem c, problem d, problem e, problem f, problem g, problem h, problem i, problem j, problem k, problem l, problem m or problem n.

Processing proceeds to step S275 where one of the responsive action sub-modules 388a to 388n (specifically the one matching the problematic condition determined at step S270) executes a responsive action. For example, if problem b is determined to be the problematic condition at step S270, then second responsive action 388b (not separately labeled in FIG. 3B for clarity of illustration purposes) is the responsive action that will be performed.

Again, the fact that all the possible responsive actions 388a to 388n are stored in cache 232 on an ongoing basis during the execution of the software makes it more likely that a problematic condition can be corrected before it turns into a problem that stops software runtime and causes a crash. Alternatively, the possible responsive actions are stored in RAM 230 (see FIG. 1).

Types of responsive actions that may be performed at step S275 include, but are not limited to: (i) generate solution report; (ii) change connection type; (iii) close connections; (iv) change auto commit status; (v) send executable solution to a customer's application server; (vi) send problem specific traces to the software support group for resolution; (vii) change software configuration(s); and/or (viii) do nothing (where potential problem is diagnosed as no problem). More detailed application server-related examples are provided below in the Further Comments and/or Embodiments section of this Detailed Description.

Processing proceeds to step S280, where symptom code sub-module 382 continues monitoring runtime activity without substantial interruption. Alternatively, upon addressing the symptoms associated with each pattern data set module in the memory, sub-mod 382 stops monitoring for symptoms. Alternatively, the software requires restarting due to a software crash or in order to implement the responsive action(s).

III. Further Comments and/or Embodiments

Some embodiments of the present invention recognize that application server customers follow numerous steps to find resolution to software problems encountered during use, including steps such as the following: (i) describe the problem; (ii) determine if the problem situation has already been reported including the following actions: (a) searching the problem symptoms in an information center, (b) searching software company's knowledge database, and/or (c) searching software developer working articles; (iii) find a software update that may solve the problem (for example, reviewing the existing authorized program analysis report (APAR) and/or installing a program containing the APAR); (iv) gather background information (if no solution exists); (v) determine the business impact; and (vi) submit the problem to the corresponding software support group by: (a) opening a PMR on-line, and (b) describing the problem. Some embodiments of the present invention recognize that despite receiving troubleshooting information, oftentimes customers: (i) are unable to pinpoint the root problem that caused the exhibited symptoms; and (ii) make attempts to find packaged solutions, which are often unsuccessful. Some embodiments of the present invention further recognize that: (i) the problem may be a combination of events that will be very hard for the customer to follow the entire chain of events to determine the precise solution; and/or (ii) there may be multiple reasons for a single problem while existing technical notes and documentation tend to list all of the possible solutions. Some embodiments of the present invention recognize that PMRs are often opened to request information on and request specific solutions to many known problems. Most PMR solutions fall into one or more of the following categories: (i) configuration changes at the application server; (ii) application modifications; (iii) application server code defects; and/or (iv) product usage issues.

Application server code defects are believed to represent about 30% of all PMRs. While self-help customer tools exist for reading traces and collecting information, application server support teams repeatedly receive PMRs for the same set of configuration problems. Some embodiments of the present invention recognize that software support assistant tools do not provide an exact solution to each problem, but several solutions to a group of related problems. In that way, the customer has to try out all possible solutions.

Some embodiments of the present invention create "problem pattern data sets" (or, more simply, "problem patterns") respectively for frequently occurring problems. Some embodiments of the present invention create problem patterns having one or more of the following characteristics: (i) loosely coupled; (ii) pluggable; (iii) ability to interact with other problem patterns; and (iv) ability to integrate with other problem patterns. Some embodiments of the present invention operate with problem patterns that include: (i) problem definition(s); (ii) data definition(s); and (iii) conclusion logic (or recommended action). Some embodiments of the present invention operate with problem patterns having a framework that: (i) plugs into other problem patterns; (ii) provides infrastructure to collect consumable data from appropriate sources; and/or (iii) feeds patterns into memory at appropriate times. This framework provides basic pattern templates that can be used to build new problem patterns. A problem pattern solves an independent problem and may also, along with other patterns, solve a larger problem. Different basic patterns can be integrated to build a new problem pattern.

Some embodiments of the present invention provide expert-based solutions to predefined problem patterns in order to leverage expert problem analysis capabilities and experience to reduce the number of PMRs for recurring problems. Because these recurring problems amount to a major portion of all software support services, implementation of a problem recognition system would significantly curtail PMRs and provide quick resolution to customers. Some embodiments of the present invention target a specific problem type so that the accuracy of providing the required solution is higher and more effective than attempting to provide a holistic solution to all problems. Some embodiments of the present invention examine lightweight, problem-specific traces to significantly reduce typical troubleshooting turnaround time. Some embodiments of the present invention use dynamic problem patterns. Dynamic patterns can be: (i) changed; (ii) started; and (iii) stopped at runtime. For example, dynamic patterns may leverage OSGi (formerly Open Services Gateway initiative) framework to acquire dynamic capabilities. (Note: the term(s) "OSGi" and/or "Open Services Gateway initiative" may be subject to trademark rights in various jurisdictions throughout the world and are used here only in reference to the products or services properly denominated by the marks to the extent that such trademark rights may exist.)

Some embodiments of the present invention use pluggable patterns. Examples of pluggable patterns include: (i) patterns that can be added to other patterns without changing the application server code; and (ii) predefined patterns that can be changed or removed without changing the application server code. Some embodiments of the present invention use extensible patterns. Problem patterns are extensible in that they can be used to build new problem definitions, as needed, to adapt to future developments.

Figure 4:
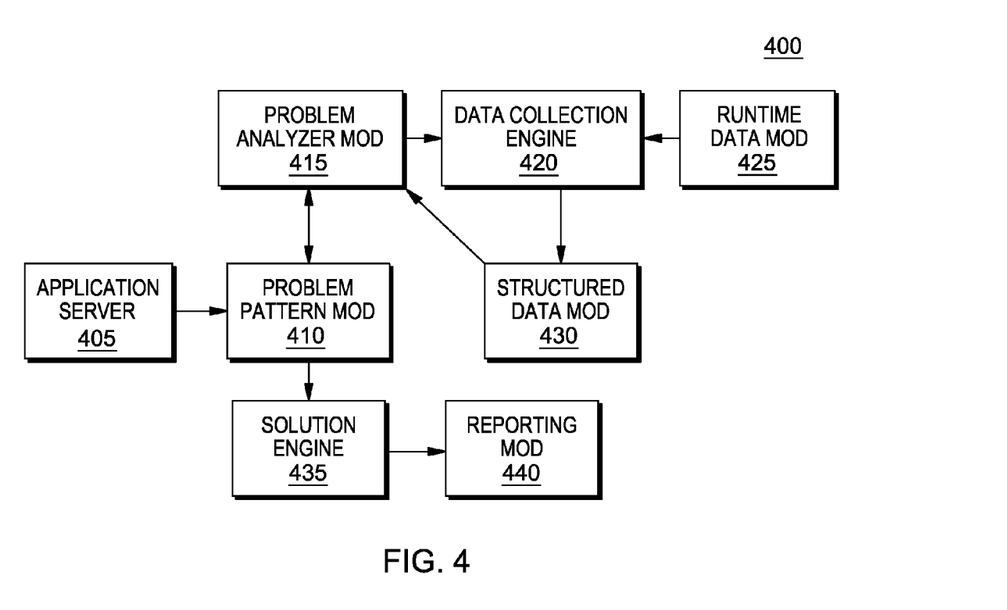
FIG. 4 is a schematic view of a portion of a second embodiment of a computer system (that is, a system including one or more processing devices) according to the present invention.

FIG. 4 is a block diagram with lines of communication for system 400 according to an embodiment of the present invention. System 400 includes: application server 405; problem pattern module ("mod") 410; problem analyzer module 415; data collection engine 420; runtime data module 425; structured data module 430; solution engine 435; and reporting module 440.

In this embodiment, application server 405 stores a pattern into a cache for a frequently occurring problem. The framework provides the interface and API's to build the pattern. The problem pattern includes problem definition data that needs to be collected and the logic to deduce a conclusion based on the collected data. Specific methods need to be implemented by the problem pattern mod 410, which are invoked by pattern analyzer mod 415. The pattern analyzer mod uses the problem pattern to determine: (i) what data should be collected; (ii) when it should be collected; and (iii) from what source it should be collected. Data collection engine 420 is invoked to collect the required data from runtime data mod 425. The required data may be, for example: (i) runtime tracing; (ii) PMI (Performance Monitoring Infrastructure) metrics; and/or (iii) FFDC. The data collection engine buffers the data in memory. Structured data module 430 buffers the data in memory in a structured way. The pattern analyzer retrieves the data from a store and, according to the logic provided by the problem pattern, deduces a conclusion. Solution engine 435 is invoked to generate a problem and solution report. The solution engine also determines if it must gather more information and/or other information needs to be collected if no solution could be provided to the customer. Where a solution can be provided, reporting module 440 provides the problem and solution report to the user for reference or to the application server for automatic resolution.

An example problem is the error "J2C Connection Pool Full." A symptom of this problem is the J2CA0045E message in SystemOut.log. Three possible causes of this problem are: (i) shared connections are held by LocalTransactionContext; (ii) connections are not closed by the application; and/or (iii) the connection pool is set to a low maximum size.

Problem pattern data includes data collection requirements. For the example problem, the following data would need to be collected: (i) connection pool data including: (a) the number of connections in use, (b) the number of connections in freepool, (c) the maximum connections of the pool, and (d) the minimum connections of the pool; (ii) the type of connection (shared or unshared); (iii) the transaction type (Local transaction context (LTC) or User transaction context); (iv) the transaction duration; (v) the handle count (to determine if the application closed the connection); and/or (vi) the autocommit status (true or false).

Problem pattern data includes conclusion logic. Conclusion logic for the example problem is as follows:

```
If(shared &<C){
//shared connections are held up LTC
}
If(Unshared && Handlecount){
//Application is not closing the connections
}
If(Shared && GlobalTran && duration{
//Long running user transactions
}
```

Problem pattern data includes recommendations. Recommendations depend on what is determined to be the root cause of the problem. Recommendations in the example case may be one of the following: (i) consider moving to unshared connection type and set autocommit to true; (ii) close connections in application (use get\use\close); (iii) avoid long-running user transaction in application; and (iv) when none of the above recommendations apply, collect minimal lightweight PoolManager.java traces, which is exactly needed to solve connection pool full pattern problem.

Figure 5:
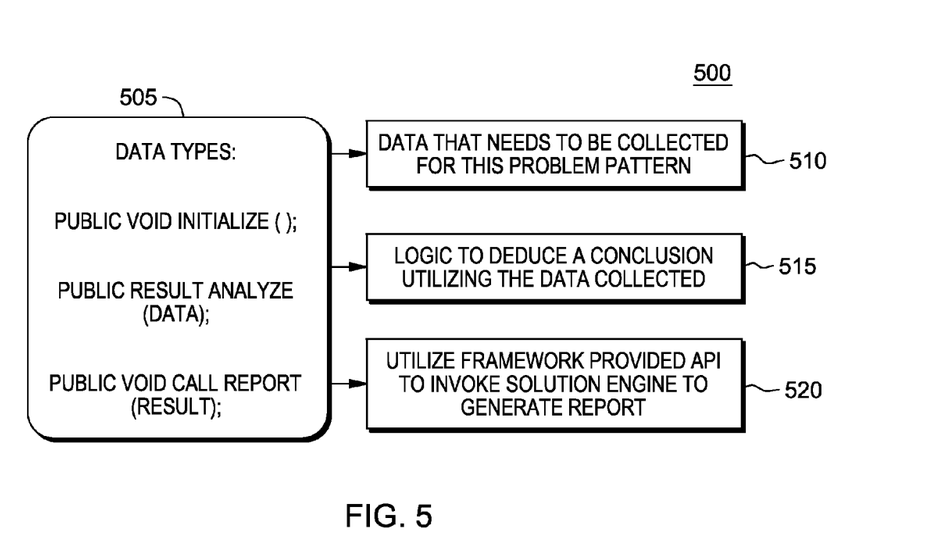
FIG. 5 is a diagram showing a framework problem pattern interface according to one embodiment of the present invention.

FIG. 5 is a diagram showing framework problem pattern interface 500 according to one embodiment of the present invention. Problem pattern interface 500 includes: problem pattern 505; data collection output 510; logic output 515; and solution output 520. The problem pattern interface is provided by software framework to pattern providers for problem pattern implementation. The logic output, or conclusion logic, is part of the analyze method, or subroutine. The solution output, or recommendations, is part of the report subroutine.

The solution engine can be run in: (i) manual mode; or (ii) automated mode. In manual mode the user restarts the server once the problem is found in a specific pattern mode. In automated mode the application server starts the data profiling, or data collection, at runtime upon the first occurrence of the problem.

Figure 6:
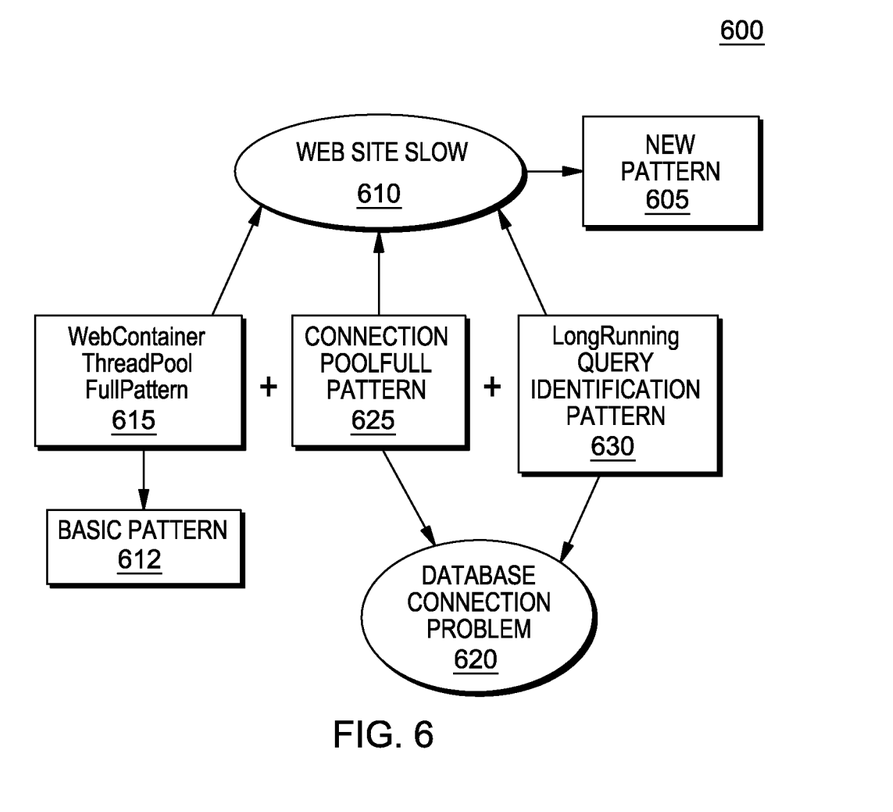
FIG. 6 is a flowchart showing a third process performed, at least in part, by the first embodiment computer system.

FIG. 6 is a flowchart of a process to build new problem patterns according to an embodiment of the present invention. Process 600 builds new problem pattern 605 associated with problem "website slow" 610 from basic pattern 612, such as pattern "web container thread pool full" 615 and a set of patterns associated with the problem "database connection problem" 620 including: (i) pattern "connection pool full" 625; and (ii) pattern "long running query identification" 630.

Some embodiments of the present invention provide a method and approach in which problem patterns can be assembled from basic patterns to cover high level problems such as site hang, etc.

In some embodiments of the present invention, the application server can be restarted in a selected problem pattern mode. For some specific categories of problems, runtime enablement is also possible.

Some embodiments of the present invention automatically enable subcategories where a broad category is selected.

Some embodiments of the present invention present a solution to the customer when the problem occurs. Alternatively, the solution is sent in executable form to the customer's application server.

Some embodiments of the present invention collect specific traces for the problem to be sent to the software support group when a solution cannot be determined.

Some embodiments of the present invention provide: (i) exact solutions, in plain text, to the recurring problems faced by customers; (ii) reduced PMR's; (iii) easy and consumable problem resolution for customers; and (iv) problem-specific traces provided initially, instead of component-specific traces, thus reducing turn-around time for the customer.

Some embodiments of the present invention provide a method and approach that runs the application server in a particular problem pattern mode and provides solutions to that problem and also collects minimum data needed if the solution is unknown.

Some embodiments of the present invention provide a pattern interface which is implemented by the pattern providers and invoked by the framework.

Some embodiments of the present invention provide a method and approach that dynamically plugs in a predefined pattern at runtime and provides a solution to a problem as it occurs.

Some embodiments of the present invention utilize existing trace information of the system generated at runtime and from other data sources, or channels, to run the problem determination logic to generate specific solutions to the problem. In many cases configuration changes are made automatically to avoid problems, even before the problem occurs.

Some embodiments of the present invention do not generate any additional traces or use any database to store the logic or traces.

Some embodiments of the present invention analyze traces automatically to determine the exact solution.

Some embodiments of the present invention store the required data for a specific problem at appropriate points to analyze traces at runtime so corrective action can be taken when the problem is imminent.

In some embodiments of the present invention the problem determination and solution logic is always loaded to automatically identify and resolve problems.

Some embodiments of the present invention combine solutions of multiple problem patterns to provide a generic solution, or single corrective action.

Some embodiments of the present invention provide an automated system to generate a solution and automatically fix a recurring problem in the product at runtime.

Some embodiments of the present invention provide an approach where the system takes automatic actions including: (i) determining the problem based on the symptoms; (ii) dynamically pulling in the diagnostic data online; (iii) analyzing the diagnostic data; (iv) giving the exact reason(s) for the failure; and/or (v) fixing the problem.

Some embodiments of the present invention take runtime actions, prior to the occurrence of a problem, including: (i) dynamic analysis of trace data; (ii) analysis of other data points; (iii) problem identification; (iv) solution determination; and/or (v) configuration changes, when needed.

Some embodiments of the present invention collect the exact required data from various sources at runtime and at specified points of time. That is to say, appropriate input is identified and consumed by the solutions engine. The collected data is validated against the problem pattern data.

In some embodiments of the present invention, when a problem is imminent or when a problem actually occurs, the corrective action(s): (i) are taken automatically at runtime; or (ii) are solution(s) provided automatically to the customer.

Some embodiments of the present invention collect and store appropriate, intermediate data related to the problem(s) in memory continuously, or at appropriate time intervals, to predict the problem occurrence by the solution engine.

Some embodiments of the present invention do more than follow a linear process of: (i) receiving problem data from a store; (ii) mapping a current problem to existing solutions or patterns in the store; and (iii) applying rules to the diagnostic data to provide a solution.

Some embodiments of the present invention take actions that include: (i) continuously collecting data related to a problem from various sources; (ii) predicting the problem occurrence; (iii) providing a solution; and (iv) combining multiple related problem patterns to provide a single larger solution.

Some embodiments of the present invention rely on problem determination experts, as problem pattern providers, to build the problem patterns. That is, the problem patterns are generated by problem experts using their experience in solving frequently occurring problems.

Some embodiments of the present invention dynamically load problem patterns at runtime to analyze frequently occurring problems.

Some embodiments of the present invention include a programmatic structure that contains threshold values for specific programmatic solution logic for use at runtime.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit.

Tangible medium software storage device: any software storage device (see Definition, above) that stores the computer code in and/or on a tangible medium.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A computer program product for determining a problematic condition caused by running of software on a computer that includes a volatile memory, the computer program product comprising software stored on a non-transitory software storage device, the software comprising:
    first program instructions programmed to load a first pattern data set into volatile memory, with the first pattern data set including a symptom code module, problematic condition determination module and a set of responsive action module(s), with each responsive action module of the set of responsive action module(s) respectively corresponding to a different problematic condition;
    second program instructions programmed to generate a runtime symptom code in response to a first problematic condition being caused by the running of the software on the computer;
    third program instructions programmed to determine, by the symptom code module of the first pattern data set stored in the volatile memory, that the runtime symptom code matches a symptom code corresponding to the first pattern data set;
    fourth program instructions programmed to collect information using a set of data collection instructions in the first pattern data set for each pattern in the first pattern data set to determine which pattern, of the first pattern data set, addresses the first problematic condition;
    fifth program instructions programmed to determine, by the problematic condition determination module of the first pattern data set stored in the volatile memory, that the first problematic condition caused the generation of the runtime symptom code; and
    sixth program instructions programmed to take a responsive action, by the responsive action module, from the set of responsive action(s) stored in the volatile memory, that corresponds to the first problematic condition;
    wherein:
    the set of data collection instructions controls collection of data needed to determine which problematic condition caused the generation of the runtime symptom code.

2. The computer program product of claim 1 wherein the responsive action is taken during the running of the software on the computer.

3. The computer program product of claim 1 wherein problematic condition determination module of the first pattern data set includes:
    the set of data collection instructions; and
    a logic module that has logic for determining an identity of the problematic condition that caused the generation of the runtime symptom code based, at least in part, upon data collected under the control of the set of data collection instructions.

4. The computer program product of claim 1 further comprising:
    seventh program instructions programmed to integrate a second pattern data set and a third pattern data set to form the first pattern data set.

5. The computer program product of claim 1 further comprising:
    seventh program instructions programmed to provide a plurality of pattern data sets including the first pattern data set;
    wherein:
    the pattern data sets of the plurality of pattern data sets are loosely coupled;
    the pattern data sets of the plurality of pattern data sets are pluggable; and
    the pattern data sets of the plurality of pattern data sets are able to interact with each other.

6. The computer program product of claim 1 wherein the responsive action, taken by the responsive action module, includes at least one of the following types of responsive actions: (i) presenting a solution, to the first problematic condition, to a customer, (ii) sending in executable form, a solution, to the first problematic condition, to the customer, and/or (iii) collecting specific traces for the first problematic condition in a form and format suitable for a software support group.

7. The computer program product of claim 1, wherein:
    the runtime symptom code corresponds to one or more symptoms of at least one problematic condition;
    the runtime symptom code is packaged with program code for operating a particular software application; and
    the runtime symptom code is identifiable by the symptom code module of the first pattern data set as corresponding to the first problematic condition.

8. A computer system for determining a problematic condition caused by running of software on a computer that includes a volatile memory, the computer system comprising:
    a processor(s) set; and
    a software storage device;
    wherein:
    the processor set is structured, located, connected and/or programmed to run software stored on the software storage device; and
    the software comprises:
        first program instructions programmed to load a first pattern data set into volatile memory, with the first pattern data set including a symptom code module, problematic condition determination module and a set of responsive action module(s), with each responsive action module of the set of responsive action module(s) respectively corresponding to a different problematic condition;

second program instructions programmed to generate a runtime symptom code in response to a first problematic condition being caused by the running of the software on the computer;

third program instructions programmed to determine, by the symptom code module of the first pattern data set stored in the volatile memory, that the runtime symptom code matches a symptom code corresponding to the first pattern data set;

fourth program instructions programmed to collect information according to each pattern in the first pattern data set to determine which pattern, of the first pattern data set, addresses the first problematic condition;

fifth program instructions programmed to determine, by the problematic condition determination module of the first pattern data set stored in the volatile memory, that the first problematic condition caused the generation of the runtime symptom code; and sixth program instructions programmed to take a responsive action, by the responsive action module, from the set of responsive action(s) stored in the volatile memory, that corresponds to the first problematic condition;

wherein:

the set of data collection instructions controls collection of data needed to determine which problematic condition caused the generation of the runtime symptom code.

9. The computer system of claim 8 wherein the responsive action is taken during the running of the software on the computer.

10. The computer system of claim 8 wherein problematic condition determination module of the first pattern data set includes:

the set of data collection instructions; and a logic module that has logic for determining an identity of the problematic condition that caused the generation of the runtime symptom code based, at least in part, upon data collected under the control of the set of data collection instructions.

11. The computer system of claim 8 wherein the software further comprises:

seventh program instructions programmed to integrate a second pattern data set and a third pattern data set to form the first pattern data set.

12. The computer system of claim 8 wherein the software further comprises:

seventh program instructions programmed to provide a plurality of pattern data sets including the first pattern data set;

wherein:

the pattern data sets of the plurality of pattern data sets are loosely coupled;

the pattern data sets of the plurality of pattern data sets are pluggable; and the pattern data sets of the plurality of pattern data sets are able to interact with each other.

13. The computer system of claim 8 wherein the responsive action, taken by the responsive action module, includes at least one of the following types of responsive actions: (i) presenting a solution, to the first problematic condition, to a customer, (ii) sending in executable form, a solution, to the first problematic condition, to the customer, and/or (iii) collecting specific traces for the first problematic condition in a form and format suitable for a software support group.

14. The computer system of claim 8, wherein:

the runtime symptom code corresponds to one or more symptoms of at least one problematic condition;

the runtime symptom code is packaged with program code for operating a particular software application; and the runtime symptom code is identifiable by the symptom code module of the first pattern data set as corresponding to the first problematic condition.

\* \* \* \* \*